United States Patent [19]

Lu

[11] Patent Number: 4,622,649
[45] Date of Patent: Nov. 11, 1986

[54] CONVOLUTION PROCESSOR

[75] Inventor: Ning H. Lu, Parsippany, N.J.

[73] Assignee: International Telephone and Telegraph Corporation, New York, N.Y.

[21] Appl. No.: 512,811

[22] Filed: Jul. 11, 1983

[51] Int. Cl.$^4$ .................... G06F 15/336; H04B 14/06
[52] U.S. Cl. ...................................... 364/728; 375/28
[58] Field of Search ................... 364/728, 747; 375/28; 370/37, 112

[56] References Cited

U.S. PATENT DOCUMENTS 3,793,513  2/1974  Kaneko ............................... 375/28

OTHER PUBLICATIONS

Nakamura "A Digital Correlator Using Delta Modulation" IEEE Trans. Acoust., Speech, Signal Processing, vol. ASSP-24, #3, pp. 238-243, Jun. 1976.

Primary Examiner—James D. Thomas
Assistant Examiner—Dale M. Shaw
Attorney, Agent, or Firm—John T. O'Halloran; Thomas F. Meagher

[57] ABSTRACT

The object of the present invention is to provide an improved convolution processor that requires no multiplication operations and can easily be implemented digitally.

The convolution processor comprises a first delta analog to digital converter disposed in a first path for one of first and second input waveforms being operated on to provide a convolution function to convert signals in the first path to a digital version thereof having a delta modulation format; a second delta analog to digital converter disposed in a second path for the other of the first and second input waveforms to convert signals in this second path to a digital version thereof having the delta modulation format; a summer coupled to the output of the first and second paths and a pair of integrators coupled in any of the following manner in the above circuit; namely, in the first path, in the second path, in the first and second paths, in the output of the summer, in the first path and the output of the summer, and in the second path and the output of the summer. The convolution function is provided at the output of the summer when the pair of integrators is coupled in the first path, the second path and in the first and second paths while the convolution function output is provided at the output of at least one of the pair of integrators when the pair of integrators is coupled in the output of the summer, in the first path and the output of the summer and, in the second path and the output of the summer.

7 Claims, 6 Drawing Figures

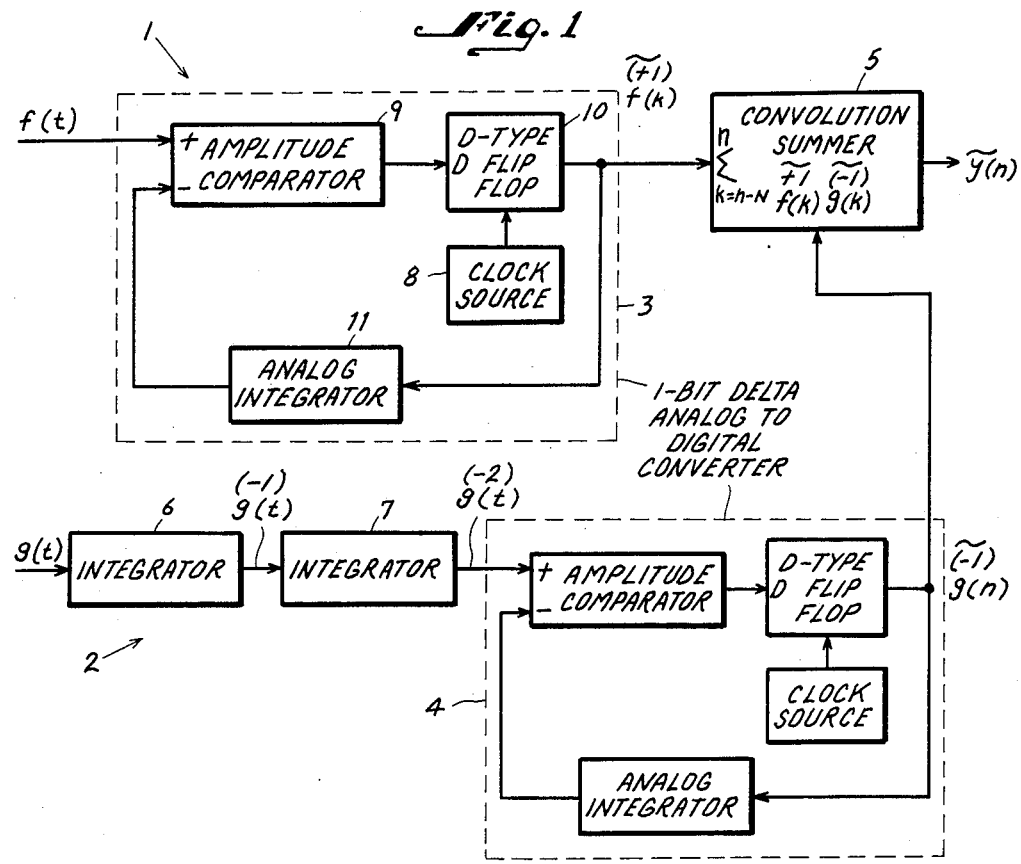
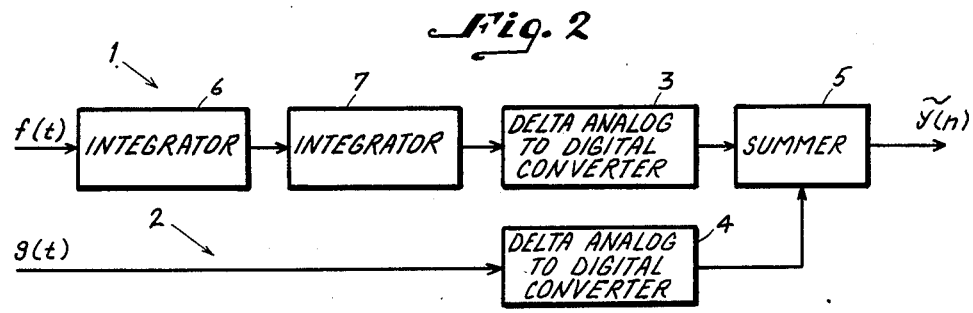

CONVOLUTION PROCESSOR

BACKGROUND OF THE INVENTION

The present invention relates to waveform processors and more particularly to a convolution processor to provide a convolution function for first and second input waveforms.

A convolution processor provides a convolution function or burst measurement which is the integral of the function $x(\tau)$ multiplied by another function $y(-\tau)$ shifted in time by t as defined by $$\int_{-\infty}^{\infty} x(\tau) y(t - \tau) d\tau.$$

As can be seen, a direct implementation of the above convolution function requires multiplication operations between the two input functions $x(\tau)$ and $y(t-\tau)$. The multiplication operations are usually not computationally efficient and are not easy to implement in hardwares.

SUMMARY OF THE INVENTION

An object of the present invention is to provide an improved convolution processor that requires no multiplication operations and can easily be implemented digitally.

A feature of the present invention is the provision of a convolution processor to provide a convolution function for first and second input waveforms comprising a first path for one of the first and second input waveforms; a second path for the other of the first and second input waveforms; a first delta analog to digital converter means disposed in the first path to convert signals in the first path to a digital version thereof having a delta modulation format; a second delta analog to digital converter means disposed in the second path to convert signals in the second path to a digital version thereof having the delta modulation format; summer means coupled to the output of the first and second paths; and a pair of integrator means coupled to a selected one of the first path, the second path, the first and second paths, the output of the summer means, the first path and the output of the summer means and the second path and the output of the summer means, the convolution function being provided at the output of the summer means when the pair of integrator means is coupled in the selected one of the first path, the second path and the first and second paths and the convolution function being provided at the output of at least one of the pair of integrator means when the pair of integrator means is coupled in the selected one of the output of the summer means, the first path and the output of the summer means and the second path and the output of the summer means.

BRIEF DESCRIPTION OF THE DRAWING

Above-mentioned and other features and objects of this invention will become more apparent by reference to the following description taken in conjunction with the accompanying drawing, in which:

FIG. 1 is a block diagram illustrating one embodiment of the convolution processor in accordance with the principles of the present invention wherein the pair of integrators is disposed in one of the signal paths; and FIGS. 2-6 are block diagrams of the convolution processor of FIG. 1 illustrating the various possible locations that the pair of integrators may assume and still provide the desired convolution function at the output of the convolution processor.

DESCRIPTION OF THE PREFERRED EMBODIMENTS

Figure 3:
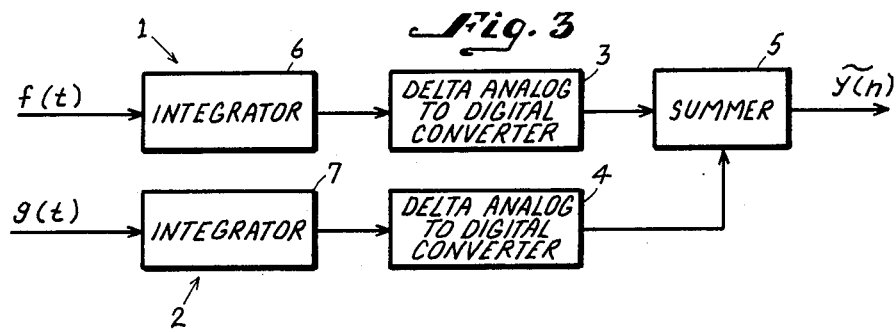

Consider the convolution of two waveforms f(t) and g(t), and let the convolution output be y(t)

$$y(t) = f(t) * g(t) = \int_{-\infty}^{\infty} f(\tau)g(t - \tau)d\tau \quad (1)$$

$$= \int_{-\infty}^{\infty} f(t - \tau)g(\tau)d\tau$$

If $g(t)=0$ for $t<0$, then equation (1) becomes $$y(t) = \int_{0}^{\infty} f(t - \tau)g(\tau)d\tau \quad (2)$$

If also $f(t)=0$ for $t<0$, then equation (2) becomes $$y(t) = \int_{0}^{t} f(\tau)g(t - \tau)d\tau = \int_{0}^{t} f(t - \tau)g(\tau)d\tau \quad (3)$$

If f(t) and g(t) are integrated and differentiated their convolution has a very important property indicated as the following from equation (3):

$$y(t) = \int_{0}^{t} f^{(+1)}(\tau)g^{(-1)}(t - \tau)d\tau = \quad (4)$$

$$\int_{0}^{t} f^{(-1)}(t - \tau)g^{(+1)}(\tau)d\tau$$

where the superscripts $(+1)$ and $(-1)$ indicate the differentiation and integration, respectively.

The convolution processor of the present application has been developed based on the theory described in equation (4).

Equation (4) can also be expressed in a discrete-time form if f(t) and g(t) are band limited as follows:

$$y(n) = \sum_{k=1}^{n} f^{(+1)}(k)g^{(-1)}(n - k) = \sum_{k=1}^{n} f^{(-1)}(n - k)g^{(+1)}(k) \quad (5)$$

or the operation can be denoted by $$y(n) = f^{(+1)}(n) * g^{(-1)}(n)$$

or $$y(n) = f^{(-1)}(n) * g^{(+1)}(n) \quad (6)$$

where it has been assumed that f(t) and g(t) can be represented by the sequences $\{f(n)\}_N$ and $\{g(n)\}_N$, respectively, where the subscript N indicates the dimension of the sequences (i.e., the number of elements).

Further, $f^{(-1)}(n)$ and $g^{(+1)}(n)$ can be quantized into a finite number of quantized levels. The quantized quantities will be denoted by adding a tilde to the terms, e.g., $\tilde{f}^{(-1)}(n)$, $\tilde{g}^{(+1)}(n)$, etc. The quantized convolution is then described as $$\overline{y(n)} = \overline{f^{(-1)}(n)} * \overline{g^{(+1)}(n)} = \overline{f^{(+1)}(n)} * \overline{g^{(-1)}(n)} \qquad (7)$$

The form of equation (7) suggests a very simple implementation of a convolution processor which utilizes a one-bit delta analog to digital converter.

As can be seen in FIG. 1, the convolution processor, to provide a convolution function as described in equation (7) for first and second input waveforms f(t) and g(t), includes a first path 1 for the input waveforms f(t) and second path 2 for the input waveform g(t). First path 1 includes a one-bit delta analog to digital converter 3 and second path 2 includes a one-bit delta analog to digital converter 4. The outputs of converters 3 and 4 are coupled to a convolution summer 5 to provide at the output thereof in the embodiment illustrated in FIG. 1 the convolution function.

In the embodiment of FIG. 1, a pair of integrators 6 and 7 are disposed in the second path 2 in a tandem relationship with each other and the input to converter 4. In this embodiment of FIG. 1 all of the basic elements as shown are effective to provide the operation of equation (7) and to provide the convolution function at the output of convolution summer 5.

Each of the converters 3 and 4 includes the same components and the components of converter 3 will be described and will apply equally to the components of converter 4.

At each clock interval provided by clock source 8, a binary decision is made by comparing the input waveform to be quantized in amplitude comparator 9 to a stored approximation of the previous sample stored in analog integrator 11. The stored approximation of the previous sample is derived from the integration of the output of D-flip flop 10 via the analog integrator 11. If the input signal is more positive than the stored approximation, a fixed positive increment is added to the approximation. Conversely, if the input signal is more negative than the previous sample, a negative increment is added to the approximation. The process is repeated at successive sampling periods, bringing the approximation continuously closer to the value of the input signal. The information on the relative increment or decrement of the successive sample is then assigned a binary state "1" or "0" as the output of the converter.

The advantage of this approach is extremely simple hardware and low-cost implementation. The limitation of the approach is the accuracy of the analog to digital converter and is a direct result of the value increment and the sampling rate used. However, the value increment can be best estimated for each application and the accuracy can be improved by increasing the sampling rate.

The integrators 6 and 7 can be analog integrators of the RC (resistive-capacitor) type or they can be accumulator type digital integrators such as a shift register and an adder.

Referring to FIG. 2, the pair of integrators 6 and 7 are shown to be located in path 1 rather than path 2, providing a second embodiment for the convolution processor of the present invention.

A third embodiment of the convolution processor of the present invention is shown in FIG. 3, wherein integrator 6 is disposed in the first path 1 and the integrator 7 is disposed in the second path 2.

Figure 4:
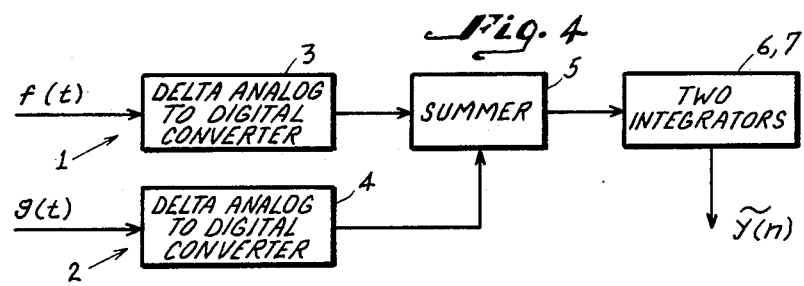

A fourth embodiment of the convolution processor of the present invention is shown in FIG. 4, wherein the integrators 6 and 7 are in tandem relationship with each other in the output of summer 5.

Figure 5:
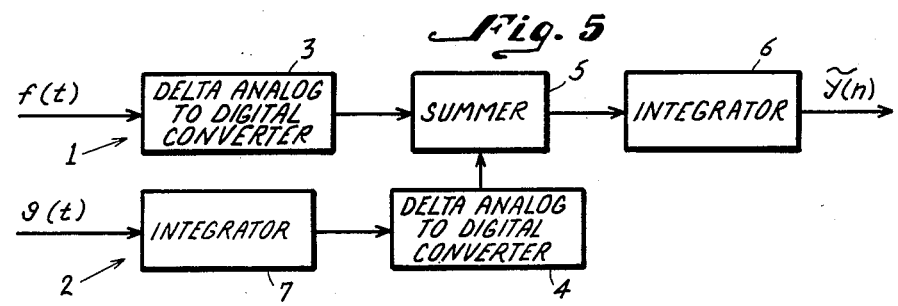

A fifth embodiment of the convolution processor of the present invention is shown in FIG. 5, wherein one of the pair of integrators, such as integrator 7, is disposed in path 2 and the other of the pair of integrators, such as integrator 6, is coupled to the output of summer 5.

Figure 6:
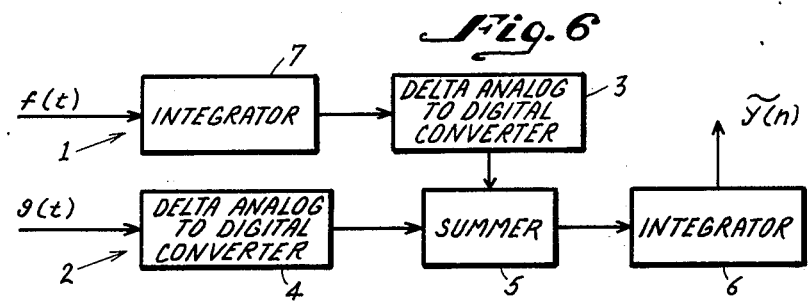

A sixth embodiment of the convolution processor of the present invention is disclosed in FIG. 6, wherein one of the pair of integrators, such as integrator 7, is disposed in path 1 while the other of the pair of integrators, such as integrator 6, is coupled to the output of summer 5.

It should be noted that a M-bit delta analog to digital converter could be used in the convolution processor of the present invention in place of the one-bit delta analog to digital converters 3 and 4 to gain additional analog to digital resolution as described in equation (7).

The convolution processor described hereinabove has the following direct applications:

(1) Filtering function—f(t) is the input signal, g(t) is the impulse response of the filtering function desired.

(2) Composite filtering function—Cascading of two filters is equivalent to a single filter with its impulse response the same as the convolution of impulse responses of two individual filters. Therefore, f(t) is the impulse response of one and g(t) is the impulse response of the other filter.

(3) Signal correlator—f(t) is the input signal and g(t) is the time-reversed desired reference signal. The output y(t) is then the correlation of the two signals.

(4) Matched filter—f(t) is the input waveform, g(t) is the time-reversed known signal and the output y(t) is then the matched filtering output.

While I have described above the principles of my invention in connection with specific apparatus, it is to be clearly understood that this description is made only by way of example and not as a limitation to the scope of my invention as set forth in the objects thereof and in the accompanying claims.

I claim:

1. A convolution processor to provide a convolution function for first and second input waveforms comprising:

a first path for one of said first and second input waveforms;

a second path for the other of said first and second input waveforms;

a first delta analog to digital converter means disposed in said first path to convert signals in said first path to a digital version thereof having a delta modulation format;

a second delta analog to digital converter means disposed in said second path to convert signals in said second path to a digital version thereof having said delta modulation format;

convolution summing means coupled to the output of said first and second paths; and a pair of integrator means each coupled in one of said first and second paths, said convolution function being provided at the output of said convolution summing means, wherein each of said first and second delta converter means is a one-bit delta analog to digital converter, wherein each of said one-bit delta converters includes an amplitude comparator having a first input to receive said signals in the respective path and a second input, a D-type flip flop coupled to an output of said comparator clocked by a predetermined clock signal to provide at its output said digital version of said signals in said respective path, and an analog integrator coupled between said output of said flip flop and said second input of said comparator.

2. A processor according to claim 1, wherein
said pair of integrator means are coupled in tandem with respect to each other and said first input of said comparator of said first path.

3. A processor according to claim 1, wherein
said pair of integrator means are coupled in tandem with respect to each other and said first input of said comparator of said second path.

4. A processor according to claim 1, wherein
one of said pair of integrator means is coupled to said first input of said comparator of said first path and the other of said pair of integrator means is coupled to said first input of said comparator of said second path.

5. A convolution processor to provide a convolution function for first and second input waveforms comprising:

a first path for one of said first and second input waveforms;

a second path for the other of said first and second input waveforms;

a first delta analog to digital converter means disposed in said first path to convert signals in said first path to a digital version thereof having a delta modulation format;

a second delta analog to digital converter means disposed in said second path to convert signals in said second path to a digital version thereof having said delta modulation format;

a convolution summing means coupled to the output of said first and second paths; and a pair of integrator means each coupled in one of said first and second paths, said convolution function being provided at the output of said convolution summing means, wherein each of said first and second delta converter means is a one-bit delta analog to digital converter, wherein said pair of integrator means are coupled in tandem with respect to each other and one of said one-bit delta converters disposed in said first path.

6. A convolution processor to provide a convolution function for first and second input waveforms comprising:

a first path for one of said first and second input waveforms;

a second path for the other of said first and second input waveforms;

a first delta analog to digital converter means disposed in said first path to convert signals in said first path to a digital version thereof having a delta modulation format;

a second delta analog to digital converter means disposed in said second path to convert signals in said second path to a digital version thereof having said delta modulation format;

convolution summing means coupled to the output of said first and second paths; and a pair of integrator means each coupled in one of said first and second paths, said convolution function being provided at the output of said convolution summing means, wherein each of said first and second delta converter means is a one-bit delta analog to digital converter, wherein said pair of integrator means are coupled in tandem with respect to each other and one of said one-bit delta converters disposed in said second path.

7. A convolution processor to provide a convolution function for first and second input waveforms comprising:

a first path for one of said first and second input waveforms;

a second path for the other of said first and second input waveforms;

a first delta analog to digital converter means disposed in said first path to convert signals in said first path to a digital version thereof having a delta modulation format;

a second delta analog to digital converter means disposed in said second path to convert signals in said second path to a digital version thereof having said delta modulation format;

convolution summing means coupled to the output of said first and second paths; and a pair of integrator means each coupled in one of said first and second paths, said convolution function being provided at the output of said convolution summing means, wherein said pair of integrator means are coupled in tandem with respect to each other and one of said first delta converter means.

* * * * *